US009500929B2

(12) United States Patent
Sun et al.

(10) Patent No.: US 9,500,929 B2
(45) Date of Patent: Nov. 22, 2016

(54) VERTICAL ELECTRO-OPTICALLY COUPLED SWITCH

(71) Applicant: Chen-Kuo Sun, Escondido, CA (US)

(72) Inventors: Chen-Kuo Sun, Escondido, CA (US); Dingbo Chen, San Diego, CA (US)

(73) Assignee: Chen-Kuo SunCA (US)

(*) Notice: Subject to any disclaimer, the term of this patent is extended or adjusted under 35 U.S.C. 154(b) by 0 days.

(21) Appl. No.: 14/687,726

(22) Filed: Apr. 15, 2015

(65) Prior Publication Data

US 2016/0306257 A1 Oct. 20, 2016

(51) Int. Cl.
*G02F 1/313* (2006.01)
*G02F 1/00* (2006.01)

(52) U.S. Cl.
CPC .......... *G02F 1/3134* (2013.01); *G02F 1/0018* (2013.01); *G02F 1/3133* (2013.01); *G02F 2001/3135* (2013.01)

(58) Field of Classification Search
CPC .. G02F 1/3134; G02F 1/0018; G02F 1/3133; G02F 2001/3135
See application file for complete search history.

(56) References Cited

U.S. PATENT DOCUMENTS

| 4,001,744 | A | 1/1977 | Conrad | |
|---|---|---|---|---|
| 4,240,693 | A * | 12/1980 | Johnson | G02F 1/313 385/18 |
| 4,525,687 | A * | 6/1985 | Chemla | B82Y 20/00 257/189 |
| 5,937,115 | A * | 8/1999 | Domash | G02F 1/313 385/10 |
| 6,836,585 | B2 | 12/2004 | Trissel et al. | |
| 6,928,248 | B2 | 8/2005 | Achour et al. | |
| 7,387,913 | B2 * | 6/2008 | Yoshimura | G02B 6/12002 257/E21.499 |
| 9,046,704 | B2 * | 6/2015 | Costache | G02F 1/035 |
| 2003/0231394 | A1 * | 12/2003 | Kimura | G09F 13/16 359/558 |
| 2004/0247236 | A1 * | 12/2004 | Yoshimura | G02B 6/12002 385/16 |
| 2005/0254752 | A1 * | 11/2005 | Domash | G02F 1/313 385/37 |
| 2006/0261432 | A1 * | 11/2006 | Yoshimura | G02B 6/12002 257/462 |
| 2013/0034323 | A1 * | 2/2013 | Costache | G02F 1/313 385/8 |
| 2015/0093067 | A1 * | 4/2015 | Manouvrier | G02F 1/225 385/3 |

FOREIGN PATENT DOCUMENTS

CN 2071793 U * 2/1991
JP 07043656 A * 2/1995
SU 1118878 A1 * 10/1984

OTHER PUBLICATIONS

Enami et al., Hybrid electro-optic polymer/sol-gel waveguide modulator fabricated by all-wet etching process, Applied Physics Letters, Dec. 2003; 83(23):4692-4694. DOI: 10.1063/1.1630850.*
Shelton et al, "Rib waveguide switches with MOS electrooptic control for monolithic integrated optics in GaAs—AlxGa1—xAs," Appl. Opt. 17, 2548-2555 (1978).*
F. Dollinger et al., "Ultrashort low-pass optical multiquantum-well GaAs/GaAlAs vertical directional coupler switch", Electronics Letters, vol. 32, No. 16, Aug. 1, 1996, p. 1509.
Masaki Kohtoku et al., "Switching Operation in a GaInAs-InP MQW Integrated-Twin-Guide (ITG) Optical Switch", IEEE Photonics Technology Letters, vol. 3, No. 3, Mar. 1991, pp. 225-226.
Masaki Kohtoku et al., "High-Speed InGaAlAs MQW Directional Coupler Waveguide Switch Modules Integrated with a Spotsize Converter Having a Lateral Taper, Thin-Film Core, and Ridge", Journal of Lightwave Technology, vol. 18, No. 3, Mar. 2000, pp. 360-369.

* cited by examiner

*Primary Examiner* — Peter Radkowski
(74) *Attorney, Agent, or Firm* — Nydegger & Associates

(57) ABSTRACT

An electro-optically coupled switch includes first and second waveguides which are aligned in parallel to each other, with a thin, flat layer of cross-coupling material sandwiched therebetween. A voltage source is provided to establish a strong uniform electric field that is oriented perpendicular across the entire layer of cross-coupling material between the waveguides. Incorporated with the voltage source is a switch for changing the electric field, to thereby alter the refractive index of the cross-coupling material for transferring the transmission of an optical signal from one waveguide to the other.

12 Claims, 2 Drawing Sheets

VERTICAL ELECTRO-OPTICALLY COUPLED SWITCH

FIELD OF THE INVENTION

The present invention pertains generally to systems and methods that employ switches and modulators during the transmission of optical signals through optical waveguides. More specifically, the present invention pertains to optical switches and modulators that employ a cross-coupling material which is sandwiched between two waveguides, wherein the waveguides are aligned parallel to each other, and an electric field, E, is used to change the refractive index, $n_c$, of the cross-coupling material to transfer an optical signal from one waveguide to the other. The present invention is particularly, but not exclusively, useful as an electro-optically coupled switch wherein the cross-coupling material is structured as a thin, flat layer, and the electrical field, E, is strong and uniform, with flux lines oriented substantially perpendicular to the entire layer of cross-coupling material and confined between the waveguides.

BACKGROUND OF THE INVENTION

It is well known that an optical waveguide is a physical structure which guides electromagnetic waves (e.g. light) through the structure. The guidance, or confinement, of light by the waveguide is the result of internal reflections within the waveguide. As a physical event, these internal reflections result when the difference between the refractive index, $n_{wg}$, of the waveguide material, and that of the surrounding environment, $n_e$, has a certain value. Otherwise, there may be no confinement, or inefficient confinement, of light within the waveguide.

It is also well known that an applied electric field can change the refractive index of a material through a linear or nonlinear electro-optic effect such as the well-known Pockels' effect (linear) or the Kerr effect (nonlinear). In particular, the Pockels' electro-optic effect is a case wherein the influence of a voltage that is applied across a material will change the index of refraction, n, of the material by an amount, Δn, which can be mathematically expressed as:

$$\Delta n = -rn^3 E/2$$

where r is the Pockels' constant, and E is the strength of the electric field. In the context of a planar, waveguide coupler switch, an electric field E is applied between two cross-coupled optical waveguides which are separated by an electro-optic material having a refractive index, $n_{eo}$. When applied, the electric field, E, changes the refractive index, $n_{eo}$, of the cross-coupling material to modify the cross-coupling characteristics between the two optical waveguides. As a result, light traveling along one waveguide is moved to the other waveguide.

With the above in mind, the design of a vertical, waveguide optical switch as envisioned for the present invention involves several interactive factors of particular importance. These include: the separation distance, d, between the waveguides (i.e. the thickness of the cross-coupling material); the refractive index of the cross-coupling material, $n_c$, (also sometimes referred to herein as $n_{eo}$); and the design (i.e. configuration) of the electric field E.

In particular, insofar as the design of the electric field is concerned, the ability of the device (i.e. electro-optic switch) to configure and confine the electric field, E, relative to the cross-coupling material is of paramount importance. Specifically, the concern here for a design of the electric field, E, is three-fold. First: the electric field, E, passing through the cross-coupling material should be uniform (i.e. the electric field flux lines are parallel to each other). Second: flux lines of the electric field, E, should be confined to the cross-coupling material. And third: the flux lines of the electric field, E, should be aligned with the polarization direction of the cross-coupling material (i.e. perpendicular to the light beam pathway in the waveguides). The purpose for harmonizing these factors is to optimize the electro-optic modulation efficiency of the device.

In light of the above, it is an object of the present invention to provide an electro-optically coupled switch having a cross-coupling material with a refractive index, $n_c$, that ensures good optical confinement between two waveguides. Another object of the present invention is to provide an electro-optically coupled switch with a cross-coupling material having a refractive index, $n_c$, that establishes a strong electro-optic modulation coefficient. Yet another object of the present invention is to design the structure for an electro-optic switch having the proper waveguide separation to achieve strong waveguide cross-coupling; while maximizing the electro-optic efficiency of the device by providing good optical confinement in the cross-coupling material that facilitates the transfer of light into or out of the waveguide. Another object of the present invention is to provide an electro-optically coupled switch wherein a uniform electric field, E, is confined and directed through a layer of cross-coupling material that is sandwiched between two optical waveguides, and wherein the electric field intensity is normal to the layer of cross-coupling material. Still another object of the present invention is to provide an electro-optically coupled switch that is simple to manufacture, is easy to use and is comparatively cost effective.

SUMMARY OF THE INVENTION

In accordance with the present invention, a vertical electro-optically coupled switch includes first and second waveguides, with a layer of cross-coupling material positioned between the waveguides. In combination, the first and second waveguides, together with the cross-coupling material located therebetween, create what is sometimes hereinafter referred to as a waveguide stack. In any event, an electric field, E, is established through the cross-coupling material. Variations in E can then be made (i.e. a switching voltage, $V_\pi$) to change the refractive index of the cross-coupling material, $n_c$ (i.e. $n_c \equiv n_{eo}$). The intended result here is to transfer the transmission of an optical signal, λ, from one waveguide to the other. Several structural aspects of the cross-coupling material, as well as functional aspects, of the electric field, E, are particularly important.

For purposes of the present invention, the layer of cross-coupling material should have a depth, d, and it should be coextensive with the length, L, of the waveguides. As envisioned for the present invention, the refractive index of a first waveguide, $n_{wg1}$, will be equal to, or nearly equal to, the refractive index of a second waveguide, $n_{wg2}$ (i.e. $n_{wg1} \approx n_{wg2}$). Importantly, however, the refractive index of the cross-coupling material, $n_c$, needs to be much greater than the respective indexes $n_{wg1}$ and $n_{wg2}$ of the first and second waveguides (i.e. $n_{wg1} \ll n_c \gg n_{wg2}$). Specifically, this selection of refractive indexes is made, along with consideration of the distance, d, to achieve strong waveguide cross-coupling, good optical confinement, and an optimum electro-optic modulation efficiency. Typically, the distance, d, between waveguides will be smaller than the value of L/$n_{wg}$ (i.e. d<L/$n_{wg}$). Further, the waveguide width, W, is optimized to improve optical confinement and to reduce optical loss.

With regard to the electric field, E, as noted above it must be strong and uniform. Further, flux lines of the electric field, E, are to be oriented substantially perpendicular to the layer of cross-coupling material that is positioned between the waveguides. Furthermore, the electric field, E, is to be confined between the waveguides across the entire layer of the cross-coupling material. To do this a filler material having a refractive index, $n_f$, is positioned against the cross-coupling material between the waveguides.

For a construction of the present invention, the depth, d, of the cross-coupling material, the length, L, of the waveguides, and the refractive indexes $n_{wg1}$, $n_{wg2}$, and $n_c$, as well as the field strength for E, all need to be selected and based upon the wavelength, λ, of the optical signal that is being transmitted. As envisioned for the present invention, the cross-coupling material may be a polymer, when the first and second waveguides are also polymers. The cross-coupling material may also be a polymer when the waveguides are a SiON/silica material. On the other hand, if the waveguides are doped materials then, depending on the doping used, the cross-coupling material can either be a polymer, a PIN planar-diode-structure semiconductor, or a PIN multiple-quantum-well semiconductor.

A voltage source is connected to the waveguide stack for selectively establishing a uniform electric field, E, through the cross-coupling material. Preferably, the electric field, E, is confined in the cross-coupling material by a filler material which encloses the cross-coupling material between the first waveguide and the second waveguide. Furthermore, and most importantly, the electric field, E, is oriented everywhere across the cross-coupling material, perpendicular to the layer of cross-coupling material.

Incorporated with the voltage source is an electric switch. Specifically, this switch is a means for imposing a switching voltage, $V_\pi$, to the waveguide stack. In particular, the switching voltage, $V_\pi$, is used to selectively change the refractive index, $n_c$, of the cross-coupling material.

In a preferred embodiment of a waveguide stack for the present invention, the first waveguide and the second waveguide are made of a SiON/silica material, and the cross-coupling material is a polymer. For this embodiment, the means for imposing $V_\pi$ on the waveguide stack includes a first transparent electrical contact that is connected with the voltage source and is positioned between the first waveguide and the cross-coupling material. A second transparent electrical contact which is connected with the voltage source and positioned between the second waveguide and the cross-coupling material is also included. In a variation of the preferred embodiment, the first waveguide, the second waveguide and the cross-coupling material can all be made of a polymer.

In a first alternate embodiment of the present invention, the first waveguide and the second waveguide are each made of a same, lightly-doped, electrically-conductive material, and the waveguides are individually positioned in contact with the voltage source. Specifically, both the first waveguide and the second waveguide are N doped. The means for imposing the switching voltage, $V_\pi$, to the waveguide stack will then include a first $N^+$ doped layer that is positioned in electrical contact between the first N doped waveguide and the voltage source. Similarly, a second $N^+$ doped layer is positioned in electrical contact between the second N doped waveguide and the voltage source. For this embodiment of the present invention the cross-coupling material is preferably a polymer.

In a second alternate embodiment of the present invention, the first waveguide is P doped and the second waveguide is N doped. In this case, the means for imposing $V_\pi$ to the waveguide stack includes a first $P^+$ doped layer positioned in electrical contact between the first P doped waveguide and the voltage source. Also, a second $N^+$ doped layer is positioned in electrical contact between the second N doped waveguide and the voltage source. For this second alternate embodiment the cross-coupling material can be either a PIN planar-diode-structure semiconductor, or a PIN multiple-quantum-well semiconductor.

For an operation of the present invention, the switch can include a first input port at the upstream end of the first waveguide, and a first output port at the downstream end of the first waveguide. Also, the switch can include a second output port at the downstream end of the second waveguide. With this arrangement, when an incoming optical signal, λ, is received at the first input port it can be selectively routed to the second output port by the switching voltage, $V_\pi$. As an additional feature of the present invention, a second input port can be used at the upstream end of the second waveguide. In this case, when an incoming optical signal, λ', is received at the second input port, it can be selectively routed to the first output port by the switching voltage, $V_\pi$.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
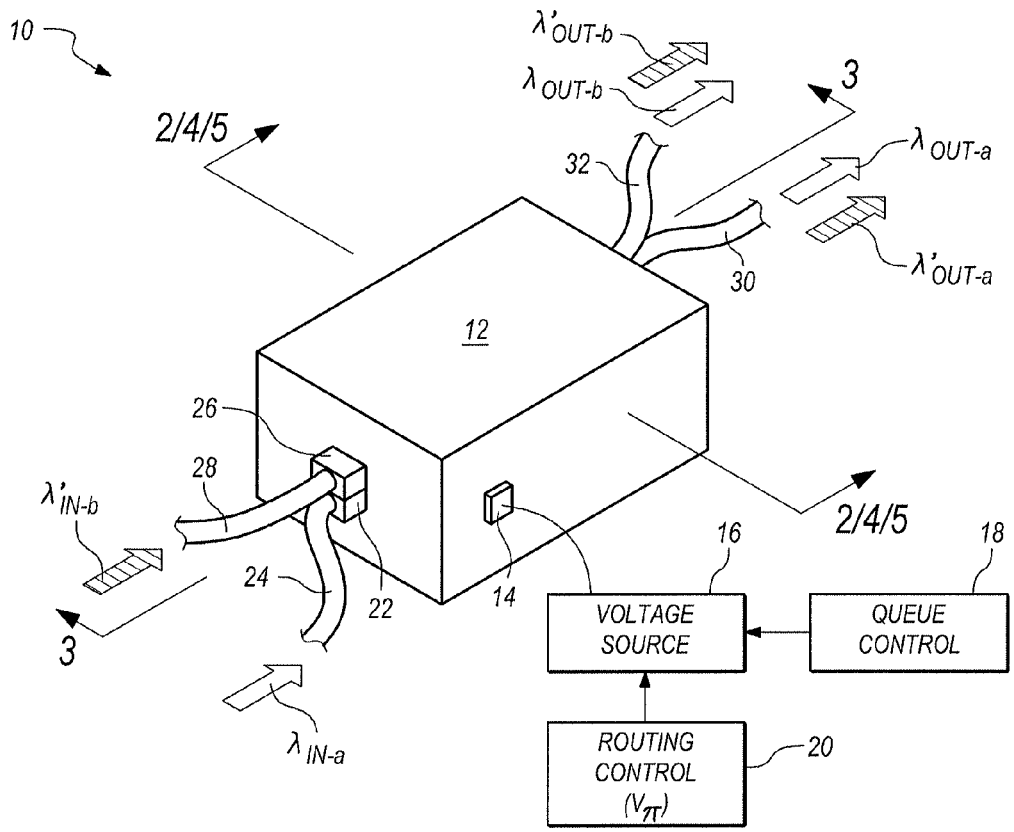
FIG. 1 is a perspective-schematic view of a system for transmitting optical signals, which includes an electro-optically coupled switch in accordance with the present invention.

Referring initially to FIG. 1, an electro-optically coupled switch in accordance with the present invention is shown and is generally designated 10. As shown, the switch 10 includes an enclosure 12 for holding and protecting the electro-optic components of the switch 10. Also, an access connector 14 is provided for connecting the electro-optic components (not shown in FIG. 1) with an external voltage source 16. A queue control 18 and a routing control 20 are incorporated with the voltage source 16 to respectively provide for the sequencing, routing and modulation of optical signals, λ, as they pass through the electro-optically coupled switch 10.

Still referring to FIG. 1, it will be seen that the enclosure 12 includes an input port 22 for optically connecting an optical waveguide 24 with the switch 10. Similarly, an input port 26 is provided by the enclosure 12 for optically connecting an optical waveguide 28 with the switch 10. It is to be appreciated that the optical waveguides 30 and 32 will have similar connections with the enclosure 12.

Figure 2:
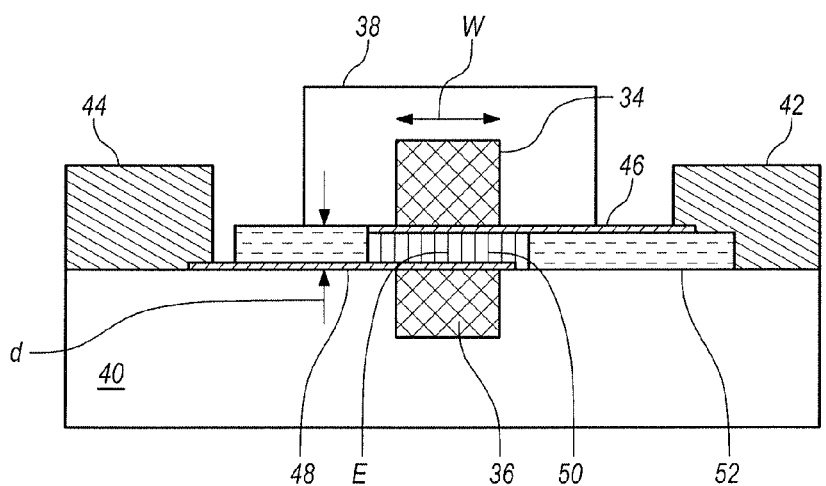
FIG. 2 is a cross-section view of an embodiment of the electro-optically coupled switch for the present invention as seen along the line 2-2 in FIG. 1.

In FIG. 2 the internal, electro-optic components for a preferred embodiment of the switch 10 are shown. There it will be seen that the switch 10 includes a waveguide 34 and a waveguide 36 that are respectively protected by a cladding 38 and a cladding 40. In more detail, each waveguide 34 and 36 has a width, W, and a length, L, and they are vertically aligned in parallel with each other. Further, as shown, the switch 10 includes a metal connector 42 (e.g. +V) and a metal connector 44 (e.g. −V) which are respectively connected with a transparent electrical contact 46 and a transparent electrical contact 48. Further, a cross-coupling material 50 is positioned between the transparent electrical contacts 46 and 48. In accordance with the present invention, the transparent electrical contacts 46 and 48 are in direct contact with the cross-coupling material 50, and are everywhere separated from each other by a distance, d. Further, the transparent electrical contacts 46 and 48 are positioned opposite each other from the cross-coupling material 50. And, they are each positioned between the cross-coupling material 50 and a respective waveguide 34 and 36. Additionally, a filler material 52 is provided to electrically confine the cross-coupling material 50 between the transparent electrical contacts 46 and 48.

Within the combination of components for the switch 10 shown in FIG. 2, the differences in the refractive index of the various materials used are important. In detail, the refractive index of waveguide 34 (a first waveguide), $n_{wg1}$, will be equal to, or nearly equal to, the refractive index of waveguide 36 (a second waveguide), $n_{wg2}$. For purposes of the present invention, the refractive indexes of the waveguides 34 and 36 will be the same, or nearly the same, $N_{wg1} \approx n_{wg2}$. Importantly, however, the refractive index of the cross-coupling material 50, $n_c$, (also sometimes noted herein as $n_{eo}$) needs to be much greater than the respective indexes $n_{wg1}$ and $n_{wg2}$ of the first and second waveguides 34 and 36 (i.e. $n_{wg1} << n_c >> n_{wg2}$). As noted above, this arrangement is made to achieve strong waveguide cross-coupling, good optical confinement in the cross-coupling material, and efficient electro-optic modulation, with a proper waveguide separation distance, d. For example, $n_c=1.7$, $n_{wg}=1.57$, and d=0.5 μm. Also, the refractive index of the filler material 52, $n_f$, needs to be smaller than all of the others (i.e. $n_c >> n_{wg(1\ and\ 2)} > n_f$ and $n_{wg1} \approx n_{wg2}$).

As shown, the metal connector 42 and the metal connector 44 are separately connected with the voltage source 16. Thus, a +V can be provided to the metal connector 42 by the voltage source 16, and a −V can be provided to the metal connector 44. The result is that a switching voltage, $\Delta V_\pi$, can be applied through the cross-coupling material 50 that will change its refractive index, $n_c$. As envisioned for the present invention, the cross-coupling material 50 may be a polymer, when the waveguides 34 and 36 are also polymers, or when the waveguides 34 and 36 are made of a SiON/silica material.

Figure 3:
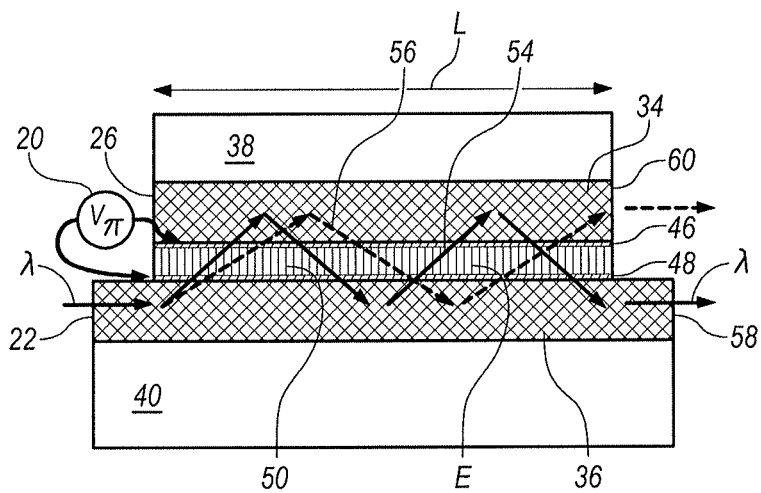
FIG. 3 is a cross-section view of an exemplary switch in accordance with the present invention, as seen along the line 3-3 in FIG. 1, showing the switch/modulation functionality of the present invention.

An operation of the switch 10 will be best appreciated with reference to FIG. 3. There it will be seen that, depending on the influence of the switching voltage, $V_\pi$, an optical signal, λ, can be directed either onto a pathway 54 (solid arrows) or a pathway 56 (dashed arrows). The consequence of this is that, the switching voltage, $V_\pi$, can be used to guide an optical signal, λ, which enters the switch 10 through the input port 22 to exit the switch 10 from either the output port 58 of waveguide 36 or the output port 60 of waveguide 34.

With the above in mind, and by returning to FIG. 1, it will be appreciated that the routing control 20 can influence the voltage source 16 to selectively establish the switching voltage, $V_\pi$, and thereby generate the electrical field, E. Importantly, the electrical field, E, when generated, is uniform with the flux lines of the field oriented substantially perpendicular to the length, L, of the waveguides 34 and 36. As mentioned above, the purpose here is to influence the transit of an optical signal, λ, through the switch 10.

For an exemplary operation of the switch 10, refer back to FIG. 1. In this example, consider an optical signal, $\lambda_{in-a}$, as input from optical waveguide 24, into the waveguide 36 via input port 22. Also consider an optical signal, $\lambda'_{in-b}$, as input from optical waveguide 28, into the waveguide 34 via input port 26. For purposes of this example, subscript "a" pertains to waveguide 36, while subscript "b" pertains to waveguide 34.

With cross-reference between FIG. 1 and FIG. 3, and first considering only the optical signal, λ, it is to be appreciated that with no switching voltage, $V_\pi$, there is no electric field, E, through the cross-coupling material 50. Accordingly, optical signal, $\lambda_{in-a}$, in optical waveguide 24 will enter switch 10 via input port 22, transit switch 10 on pathway 54, and exit from switch 10 via the output port 58 (FIG. 3) and into the optical waveguide 30 as optical signal, $\lambda_{out-a}$. On the other hand, with a switching voltage, $V_\pi$, imposed on the cross-coupling material 50, an electric field, E, is generated through the cross-coupling material 50 to change the refractive index, $n_c$ ($n_{eo}$), of the cross-coupling material 50. In this case, the optical signal, $\lambda_{in-a}$, will transit switch 10 on pathway 56, and exit from switch 10 via the output port 60 (FIG. 3), and into the optical waveguide 32 as optical signal, $\lambda_{out-b}$.

Similarly, when considering the optical signal, λ', it is to be appreciated that with no switching voltage, $V_\pi$, optical signal, $\lambda'_{in-b}$, will enter switch 10 from optical waveguide 28 via input port 26. Optical signal, $\lambda'_{in-b}$, will then transit switch 10 and exit via the output port 60 (FIG. 3) and into the optical waveguide 32 as optical signal, $\lambda'_{out-b}$. With a switching voltage, $V_\pi$, imposed on the cross-coupling material 50, however, the optical signal, $\lambda'_{in-b}$, will transit switch 10 to exit from switch 10 via the output port 58 (FIG. 3), and into the optical waveguide 30 as optical signal $\lambda'_{out-a}$.

Still referring to FIG. 1 it is to be appreciated that the switch 10 can be used either as a switch or as a modulator. Further, it will be appreciated that the queue control 18 can be used as a gate to provide for alternating or sequential access of the optical signals, λ and λ', to the switch 10. As will be appreciated by the skilled artisan, when switch 10 is used as a modulator, only one continuous wave (CW) light input port 22 and one optical output port (e.g. output port 58, FIG. 3) are required.

Figure 4:
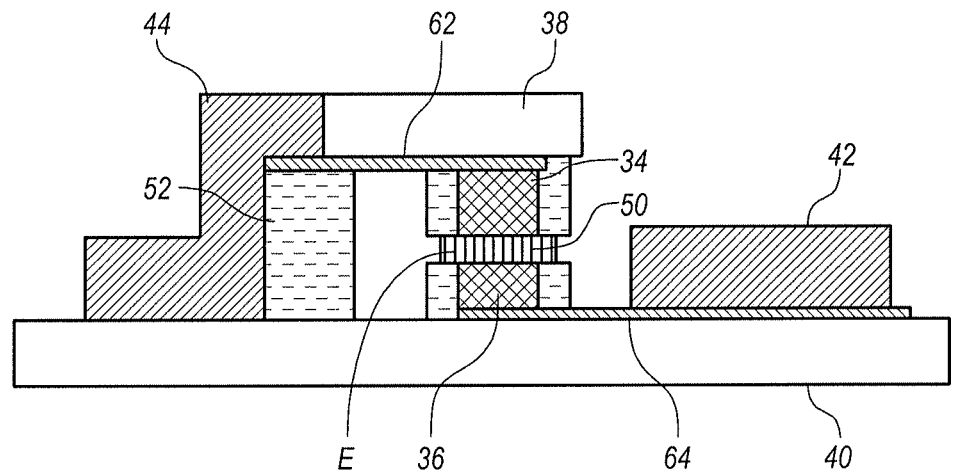
FIG. 4 is a cross-section view of another embodiment of the electro-optically coupled switch for the present invention as seen along the line 4-4 in FIG. 1.

FIG. 4 shows an alternate embodiment for the present invention wherein the waveguide 34 and the waveguide 36 are each made of a same, lightly-doped, electrically-conductive material. As shown, the waveguides 34 and 36 are individually positioned in contact with the voltage source 16. For one alternate embodiment of the present invention, both the waveguide 34 and the waveguide 36 are N doped. Accordingly, the means for imposing the switching voltage, $V_\pi$, includes an N+ doped layer 62 that is positioned in electrical contact between the N doped waveguide 34 and the metal connector 44. Similarly, an N⁺ doped layer 64 is positioned in electrical contact between the N doped waveguide 36 and the metal connector 42. Preferably, for this alternate embodiment of the present invention, the cross-coupling material 50 is a polymer.

Figure 5:
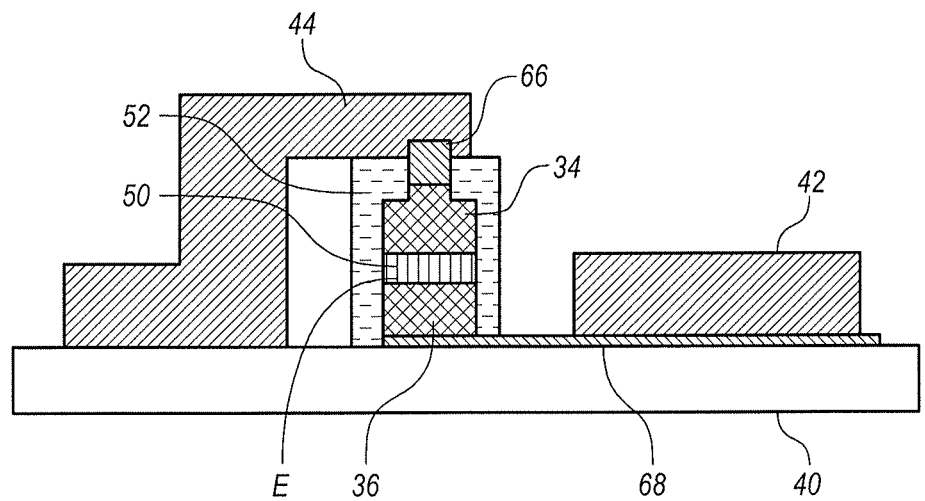
FIG. 5 is a cross-section view of still another embodiment of the electro-optically coupled switch for the present invention as seen along the line 5-5 in FIG. 1.

FIG. 5 shows another alternate embodiment of the present invention wherein the waveguide 34 is P doped and the waveguide 36 is N doped. In this case, the means for imposing $V_\pi$ includes a P⁺ doped layer 66 positioned in electrical contact between the P doped waveguide 34 and the metal connector 44. Also included is an N⁺ doped layer 68 which is positioned in electrical contact between the N doped waveguide 36 and the metal connector 42. In this case, the cross-coupling material 50 can be either a PIN planar-diode-structure semiconductor, or a PIN multiple-quantum-well semiconductor.

While the particular Vertical Electro-Optically Coupled Switch as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An electro-optically coupled switch which comprises:
   a first waveguide having a length L and a width W, wherein the first waveguide has a refractive index $n_1$;
   a second waveguide having a length L and a width W, wherein the second waveguide is aligned parallel with the first waveguide, and wherein the second waveguide has a refractive index $n_2$ resembling $n_1$ ($n_1 \approx n_2$);
   a first electrical contact;
   a second electrical contact,
   a layer of cross-coupling material positioned between the first waveguide and the second waveguide, and positioned between the first electrical contact and the second electrical contact, wherein the first waveguide, the second waveguide, the first electrical contact, the second electrical contact and the cross-coupling material are positioned in a vertical alignment with each other, wherein the layer of cross-coupling material has a depth d and a refractive index $n_c$;
   a voltage source connected with the first electrical contact and with the second electrical contact for selectively establishing a uniform electric field E, wherein the electric field is confined in the cross-coupling material between the first waveguide and the second waveguide and is oriented perpendicular to the layer of cross-coupling material to create a confined electric field; and
   a means connected with the voltage source for imposing a voltage to change the refractive index $n_c$.

2. The switch as recited in claim 1 wherein $n_c$ is much greater than $n_1$ and $n_2$ ($n_1 \ll n_c \gg n_2$, and $n_1 \approx n_2$) to ensure optical confinement, cross-coupling between the first waveguide and the second waveguide, and a proper depth d, to enhance optical modulation efficiency.

3. The switch as recited in claim 1 wherein the first waveguide and the second waveguide are made of a SiON/silica material and the cross-coupling material is a polymer.

4. The switch as recited in claim 3 wherein the
   first electrical contact is transparent and is positioned between the first waveguide and the cross-coupling material, and wherein the
   second electrical contact is transparent and is positioned between the second waveguide and the cross-coupling material.

5. The switch as recited in claim 1 wherein the first waveguide, the second waveguide and the cross-coupling material are made of a polymer.

6. The switch as recited in claim 1 wherein the first waveguide and the second waveguide are made of an electrically-conductive material, and are N doped and further wherein the first electrical contact is an N⁺ doped layer positioned in electrical contact between the first N doped waveguide and the voltage source, and the second electrical contact is an N⁺ doped layer positioned in electrical contact between the second N doped waveguide and the voltage source.

7. The switch as recited in claim 1 wherein the first waveguide is P doped and the second waveguide is N doped and
   the first electrical contact is a P⁺ doped layer positioned in electrical contact between the first P doped waveguide and the voltage source, and
   the second electrical contact is an N⁺ doped layer positioned in electrical contact between the second N doped waveguide and the voltage source.

8. The switch as recited in claim 7 wherein the cross-coupling material is a PIN planar-diode-structure semiconductor.

9. The switch as recited in claim 7 wherein the cross-coupling material is a PIN multiple-quantum-well semiconductor.

10. The switch as recited in claim 1 further comprising a filler material, wherein the filler material has a refractive index $n_f$, and is positioned against the cross-coupling material between the first waveguide and the second waveguide to confine the cross-coupling material therebetween.

11. The switch as recited in claim 1 wherein the first waveguide and the second waveguide each have an upstream end and a downstream end, and wherein the switch further comprises:
   a first input port at the upstream end of the first waveguide;
   a first output port at the downstream end of the first waveguide; and
   a second output port at the downstream end of the second waveguide, wherein an incoming optical signal λ is received at the first input port and is selectively routed to the second output port by a switching voltage $V_\pi$.

12. The switch as recited in claim 11 further comprising a second input port at the upstream end of the second waveguide, wherein an incoming optical signal λ' is received at the second input port and is selectively routed to the first output port by the switching voltage $V_\pi$.

* * * * *

UNITED STATES PATENT AND TRADEMARK OFFICE
CERTIFICATE OF CORRECTION

PATENT NO. : 9,500,929 B2
APPLICATION NO. : 14/687726
DATED : November 22, 2016
INVENTOR(S) : Chen-Kuo Sun and Dingbo Chen It is certified that error appears in the above-identified patent and that said Letters Patent is hereby corrected as shown below:

In the Specification

Column 1, Line 46 - Insert paragraph break after the text that reads "electric field."

Column 1, Line 46 - Insert new paragraph beginning with the text "In the context of a planar," and have text wrap accordingly. New paragraph ends with text currently in Column 1, Line 54 that reads "moved to the other waveguide."

Column 5, Line 41 - Delete formula reading "$N_{wg1} \approx n_{wg2}$" and insert formula that should read -- $n_{wg1} \approx n_{wg2}$ --

Signed and Sealed this
Eighth Day of May, 2018

Andrei Iancu
*Director of the United States Patent and Trademark Office*